United States Patent [19]

Hülsmann et al.

[11] 3,821,292

[45] June 28, 1974

[54] PROCESS FOR THE PREPARATION OF PURE SODIUM BENZOATE

[75] Inventors: Hans Leo Hülsmann, Wengern; Gustav Renckhoff, Witten-Ruhr, both of Germany

[73] Assignee: Dynamit Nobel AG, Troisdorf, Germany

[22] Filed: Feb. 18, 1971

[21] Appl. No.: 116,605

[30] Foreign Application Priority Data

Feb. 20, 1970  Germany............................ 2007783

[52] U.S. Cl.......................... 260/515 R, 260/476 R
[51] Int. Cl............................................... C07c 63/06
[58] Field of Search......................... 260/515 R, 525

[56] References Cited
UNITED STATES PATENTS

| | | | |
|---|---|---|---|
| 1,866,849 | 6/1932 | George | 260/515 |
| 2,744,938 | 5/1956 | Urban | 260/525 |
| 2,749,363 | 6/1956 | Williamson et al. | 260/525 |
| 2,879,288 | 3/1959 | Grosskinsky et al. | 260/525 |

Primary Examiner—James A. Patten
Attorney, Agent, or Firm—Craig and Antonelli

[57] ABSTRACT

The present disclosure is directed to a process for the preparation of substantially pure sodium benzoate which comprises treating commercial grade methyl benzoate with acidic bleaching clay, of the montmorillonite type fractionally distilling the methyl benzoate to obtain a constant boiling-point, substantially pure fraction of methyl benzoate and saponifying the mixture with sodium hydroxide to obtain substantially pure sodium benzoate.

18 Claims, No Drawings

PROCESS FOR THE PREPARATION OF PURE SODIUM BENZOATE

BACKGROUND OF THE DISCLOSURE

The present invention relates to a process of producing pure methyl benzoate from the by-products automatically obtained during the large-scale industrial production of dimethyl terephthalate by air oxidation of p-xylene. The present invention is also directed to producing sodium benzoate by the saponification of methyl benzoate.

The acids produced during the air oxidation of p-xylene are first esterified with methanol. The mixture of the methyl esters, the main components of which are methyl p-toluate, dimethyl terephthalate and the methyl esters of other mono- and polyfunctional acids, is separated when conducting the process on a large industrial scale, either by distillation or by recrystallization, or also by a procedure combining these two steps, into dimethyl terephthalate, intermediates to be recycled into the process, and by-products to be discharged. The latter contain, in addition to methyl benzoate which is predominantly enriched in the sump product of the methanol rectification stage, many compounds exhibiting almost identical boiling points, so that an economical preparation by the use of distillation alone, i.e., without removing the compounds having boiling points approximately that of methyl benzoate, is impossible. Even with the use of a column with 4- practical plates and with a reflux ratio of 40:1, the fractional distillation yields only a fragment of the methyl benzoate contained in the by-products. In addition, benzoate additionally contains oxidizable and thermolabile compounds which very much impair the quality of sodium benzoate produced therefrom. Thus, the sodium benzoate obtained by the saponification of such methyl benzoate fractions does not satisfy the purity requirements of DAB 7 (Deutsches Arzneibuch - a German Drug Book covering standards for compounds), especially with respect to resistance against permanganate and concentrated sulfuric acid. Since it has been impossible heretofore to economically obtain pure methyl benzoate and pure secondary products from the by-products of the air oxidation of p-xyxlene, the by-products have been burned as worthless waste substances.

SUMMARY OF THE INVENTION

An object of the present invention is to avoid the prior art disadvantages in producing methyl benzoate and sodium benzoate.

Another object of the present invention is to produce pure methyl benzoate and pure sodium benzoate from the by-products obtained in the production of dimethyl terephthalate by the air oxidation of p-xylene.

A further object of the present invention is to produce sodium benzoate which exhibits resistance against permanganate and concentrated sulfuric acids.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that pure sodium benzoate can be obtained, in a simple and economical manner, from the by-products obtained in the production of dimethyl terephthalate, by the air oxidation of p-xylene by way of the methyl p-toluate in the liquid phase, for example, according to German Pat. No. 1,041,945, by continuously or discontinuously heating methyl benzoate, obtained from the by-products and enriched by distillation to a purity above about 80 percent, with about 0.1 to 10 percent by weight, preferably about 0.2 to 1 percent by weight of an acidic i.e., acid activated, bleaching clay, of the moutmorillonite type at a temperature of about 150° to 250°C. The resulting ester is filtered and subjected to fractional distillation under atmospheric pressure or under vacuum. The constant-boiling-point fraction is then saponified with equivalent amounts of an aqueous solution of sodium hydroxide (DAB 7) in such a manner that the solution is immediately consumed. Thereafter, steam (water vapor) is introduced into the hydrolysate until no more volatile organic compounds pass over. The neutral, aqueous solutions are then evaporated to dryness, optionally after a treatment with adsorbents, for example, activated carbon or kieselguhr.

During the heating of the impure methyl benzoate with the acidic bleaching clay, a large portion of the compounds having boiling points in the vicinity of the boiling point of methyl benzoate is removed or converted into higher-boiling condensation products. This treatment can be conducted in a discontinuous or continuous manner. In the discontinuous mode of operation, the ester can be heated, for example, with pulverized bleaching clay under agitation to the above-mentioned temperature. In the continuous mode of treatment, the ester phase, which has optionally been preheated, passes a fixed bed of lumpy (pelletized) or spherical bleaching clay, maintained at the treatment temperature. Additional concomitant substances are only partially removed by this thermalcatalytic treatment. The complete removal of the remaining residue is effected by the further procedures, according to the invention, i.e., the saponification of the constant-boiling ester fraction in such a manner that the amount of aqueous sodium hydroxide added in batches and being, in total, equivalent, is at once consumed, a subsequent steam treatment of the aqueous solution, and, optionally, a final clarifying step with adsorbents.

From the thus-obtained pure, neutral, concentrated sodium benzoate solutions, the pure salt is obtained by drying in a suitable, conventional manner, for example in a spray tower or on drying rolls.

The test regarding purity is conducted in accordance with the regulations of the "Deutsches Arzneibuch" (German Drug Book), seventh Edition, pp. 697 et seq., 1968, Deutscher Apothekerverlag (publishers) Stuttgart, Germany. One of the important uses of sodium benzoate is as a preservative.

The following example is considered to be examplary of the present invention and accordingly, is not to be considered as limiting.

EXAMPLE 1,000 parts by weight of a commercial grade methyl benzoate, with a purity of 89 percent, is heated under agitation with five parts by weight of bleaching clay KSF (an acid treated moutmorillonite in powdered form supplier: Suedchemie, Munich) for 30 minutes at 180°C. The low-boiling accompanying substances are withdrawn at the head of the reflux column. By fractional distillation under atmospheric pressure, 750 parts by weight of methyl benzoate with a purity of 98.2 percent is obtained, having a constant boiling point of 199.0° to 199.5°C. 100 parts by weight of the constant-boiling-point fraction and 340 parts by weight of distilled water are heated, under agitation, to boiling, and 58.6 parts by weight of 50 percent aqueous solution of sodium hydroxide (DAB 7) is added in batches in such a manner that the solution is immediately consumed. The addition of the sodium hydroxide solution is effected within 30 minutes. The mixture is stirred for one hour at the boiling temperature thereof. During this step, a portion of the methanol is removed from the reactor with steam. Thereafter, 200 parts by weight of water is distilled off, and steam is passed through the solution for 30 minutes. The sodium benzoate solution, concentrated to about 300 liters, is treated with, respectively, 1.5 parts by weight of activated carbon and bleaching clay and filtered. By evaporating the solution to dryness, 100 parts by weight of sodium benzoate is obtained. The salt has a purity of 99.8 percent. 10.0 ml. of testing solution according to DAB 7 consumes 0.03 ml. N/10 NaOH. Heavy metal, chloride, and sulfate ions, halogen compounds, and oxidizable compounds cannot be detected. The salt is indifferent with respect to concentrated sulfuric acid.

The invention being thus described, it will be obvious that the same may be varied in many ways. Such variations are not be regarded as a departure from the spirit and scope of the invention, and all such modifications as would be apparent to one skilled in the art are intended to be included.

What is claimed is:

1. A process for the preparation of substantially pure sodium benzoate which comprises treating commercial grade methyl benzoate, recovered from the by-products obtained in the production of dimethyl terephthalate by air oxidation of p-xylene and enriched to a purity of above about 80 percent, with a catalytic amount of an acid activated bleaching clay of the montmorillonite type with the application of heat, fractionally distilling the treated methyl benzoate to obtain a constant boiling-point, substantially pure fraction of methyl benzoate, saponifying the fraction with sodium hydroxide, introducing steam into the resulting hydrolysate until no more volatile organic compounds pass over, and recovering substantially pure sodium benzoate from the steam-treated hydrolysate.

2. The process of claim 1, wherein the commercial grade methyl benzoate contains compounds having boiling points in the vicinity of the boiling point of methyl benzoate and oxidizable and thermolabile compounds, said compounds being substantially removed by the treatment with said acidic acid activated bleaching clay.

3. The process of claim 1, wherein the methyl benzoate obtained from the by-products is enriched by distillation to a purity of above about 80 percent before being heated continuously or discontinuously with the bleaching clay.

4. The process of claim 3, wherein said heating is conducted at a temperature of about 150° to 250°C.

5. The process of claim 4, wherein the catalytic amount of bleaching clay present is from about 0.1 to 10 percent by weight.

6. The process of claim 1, wherein after the steam is introduced, and the resulting neutral, aqueous solution is evaporated to dryness.

7. The process of claim 6, wherein prior to evaporation the solution is treated with adsorbents.

8. The process of claim 7, wherein the adsorbents are selected from the group consisting of carbon and kieselguhr.

9. The process of claim 3, wherein during a discontinuous process methyl benzoate is heated with the acid activated bleaching clay in pulverized form.

10. The process of claim 3, wherein during a continuous process the methyl benzoate is preheated and passed over a fixed bed of pelletized acid activated bleaching clay which is maintained at the treatment temperature.

11. A process for the preparation of substantially pure sodium benzoate from the by-products obtained in the industrial production of dimethyl terephthalate by the air oxidation of p-xylene, which comprises enriching methyl benzoate obtained from said by-products by distillation to a purity above about 80 percent, adding from about 0.1 to 10 percent by weight of an acid activated bleaching clay of the montmorillonite type to the enriched methyl benzoate and heating the mixture at a temperature of about 150° to 250°C., fractionally distilling the methyl benzoate to obtain a constant boiling-point fraction, saponifying the fraction having a constant boiling point with an equivalent amount of an aqueous solution of sodium hydroxide so that the solution is immediately consumed, introducing steam into the hydrolysate until no volatile organic compounds pass over, and evaporating the resulting neutral aqueous solution to dryness to recover substantially pure sodium benzoate salt.

12. The process of claim 11, wherein prior to evaporation, the aqueous solution is treated with adsorbents.

13. The process of claim 11, wherein the bleaching clay is present in an amount of about 0.2 to 1 percent by weight.

14. The process of claim 11, wherein prior to the second distillation step, the methyl benzoate is filtered.

15. The process of claim 14, wherein the second distillation step is conducted under atmospheric pressure or under vacuum.

16. The process of claim 11, wherein the second distillation step produces methyl benzoate with a purity of about 98.2 percent and a constant boiling point of about 199.0° to 199.5°C.

17. The process of claim 11, wherein the sodium benzoate salt has a purity of about 99.8 percent.

18. The process of claim 11, wherein said enriched methyl benzoate contains compounds having boiling points in the vicinity of the boiling point of methyl benzoate and oxidizible and thermolabile compounds, said compounds being substantially removed by the treatment with said acid activated bleaching clay.

* * * * *